(12) United States Patent
Fujii et al.

(10) Patent No.: US 6,501,326 B2
(45) Date of Patent: Dec. 31, 2002

(54) SEMICONDUCTOR INTEGRATED CIRCUIT

(75) Inventors: Nobuyuki Fujii, Tokyo (JP); Fukashi Morishita, Tokyo (JP); Akira Yamazaki, Tokyo (JP); Yasuhiko Taito, Tokyo (JP); Mako Okamoto, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/849,392

(22) Filed: May 7, 2001

(65) Prior Publication Data

US 2002/0075064 A1 Jun. 20, 2002

(30) Foreign Application Priority Data

Dec. 20, 2000 (JP) ......................................... 2000-387687

(51) Int. Cl.[7] ................................................. G05F 1/10
(52) U.S. Cl. ...................................................... 327/536
(58) Field of Search ................................. 327/530, 534, 327/536, 537

(56) References Cited

U.S. PATENT DOCUMENTS

| | | | |
|---|---|---|---|
| 5,841,725 A | 11/1998 | Kang et al. | 365/226 |
| 6,177,828 B1 * | 1/2001 | Kang et al. | 327/536 |
| 6,316,985 B1 * | 11/2001 | Kobayashi et al. | 327/536 |

FOREIGN PATENT DOCUMENTS

JP        A 2000-112547        4/2000

* cited by examiner

*Primary Examiner*—Jeffrey Zweizig
(74) *Attorney, Agent, or Firm*—Burns, Doane, Swecker & Mathis, LLP

(57) ABSTRACT

A capacitor (C12) is connected between a node (L) in a double boost part and the ground, and the amplitude of a repetitive pulse from the node (L) is made less than twice that of the power-supply voltage through utilization of charge and discharge of the capacitor (C12).

16 Claims, 12 Drawing Sheets

SEMICONDUCTOR INTEGRATED CIRCUIT

BACKGROUND OF THE INVENTION

1. Field of the Invention

The present invention relates to a semiconductor integrated circuit that constitutes a charge pump circuit which uses a predetermined power-supply voltage and responds to a clock signal to provide an internal voltage different from the power-supply voltage.

2. Description of the Prior Art

FIG. 11 depicts in block form the configuration of a conventional substrate bias circuit (a VBB circuit). Reference numeral 1 denotes a detector that detects a negative internal voltage VBB for supply to a peripheral circuit, a device substrate, a well (not shown) and so forth; 2 denotes a ring oscillator for actuation use that generates a clock signal for actuation use; 3 denotes a ring oscillator for standby use that generates a clock signal for standby use; 4 denotes a charge pump circuit for actuation use that responds to the clock signal for actuation use to provide the internal voltage VBB during actuation; and 5 denotes a charge pump circuit for standby use that responds to the clock signal for standby use to provide the internal voltage during standby.

The circuit configuration of the charge pump circuit falls into two: a single boost type and a double boost type. The single boost type has the advantages over the double boost type that it does not occupy much space and hence is space-saving and that its simple circuit configuration provides increased reliability and yield. However, the single boost type has a drawback that a drop in the power-supply voltage leads to insufficient supply of the internal voltage VBB.

On the other hand, the double boost type has the advantage that the internal voltage VBB can be supplied sufficiently even if the power-supply voltage is low to some extent, but has the defects that it occupy much space and hence is space-consuming and that its complicated circuit configuration is likely to affect reliability and yield; furthermore, since the power-supply, voltage cannot be much raised because too high a supply voltage would break down transistors of the double boost part, it may sometimes be necessary that the potential after lowering the power-supply voltage by an internal step-down circuit be used as the power supply for the charge pump circuit.

For the reasons given above, it is common practice in the art, in the case of mounting the substrate bias circuit on a chip, to design the semiconductor integrated circuit using either one of the single and double boost type charge pump circuits to meet specifications required.

FIG. 12 is a diagram depicting an example of a conventional semiconductor integrated circuit configuration, which uses the single boost type charge pump circuit. The double boost type charge pump circuit differs from the single boost type in the part surrounded by the broken lines.

The operation of the charge pump circuit shown in FIG. 12 will be described below. Assume that initial values of the potentials of nodes A to F are zero.

(1) Upon the input being switched from 0 to the power-supply voltage Vcc, the potentials of the nodes A and B change from 0 to Vcc, but the node C remains at zero potential. The potentials of the nodes D and E naturally ought to change by +Vcc since they are connected to the nodes A and B via capacitors C1 and C2, respectively, but since transistors Q4 and Q5 are in the ON state, the potentials of the nodes D and E stay low or zero until the transistors Q4 and Q5 turns OFF.

(2) Next, upon the input being switched from Vcc to 0, the potential of the node C changes from 0 to Vcc accordingly. The potential of the node F ought to change by +Vcc correspondingly, but since a transistor Q1 turns ON, the node F remains at zero potential until the transistor Q1 turns OFF. The potential of the node F at this time reaches a threshold value Vth of the transistor Q1, and consequently the transistors Q4 and Q5 turn OFF.

(3) Then, the potential of the node A changes Vcc to 0, and the potential of the node D drops by −Vcc accordingly.

(4) Then, the potential of the node B changes from Vcc to 0, and the potential of the node E changes to −Vcc, with the result that a transistor Q6 turns ON, permitting the passage therthrough of a negative potential from the node D as the internal voltage VBB.

(5) Then, upon the input being switched from 0 to Vcc, the potential of the node B changes from 0 to Vcc. Since the potential of the node E changes to +Vcc correspondingly, the transistor Q6 turns OFF, inhibiting the supply of the internal voltage VBB.

(6) Then, the potential of the node C changes from Vcc to 0, and the potential of the node F changes to −Vcc correspondingly. As a result, the transistors Q4 and Q5 turn ON, reducing the potentials of the nodes D and E down to zero.

(7) Then, the potential of the node A changes from 0 to Vcc, but since the transistor Q4 is in the ON state, node D remains at zero potential.

(8) By repeating steps (2) to (7), the potential of the internal voltage VBB is made to gradually go negative. FIG. 13 shows the general outlines of the timing when the steady state is reached after the repetition of the above steps.

FIG. 14 depicts an example of only a double boost part of the double boost type charge pump circuit in the configuration of the conventional semiconductor integrated circuit. The substitution of this circuit for the broken line part in FIG. 12 provides the double boost type charge pump circuit. That is, the output of the circuit depicted in FIG. 14 is connected to the node E in FIG. 12, through which it is connected to the gate of the transistor Q6 that supplies the internal voltage VBB.

Next, the operation of the semiconductor integrated circuit of FIG. 14 will be described below.

Assuming that the input is the power-supply voltage Vcc in the initial state, nodes G and I are both at zero potential and a node H is at potential Vcc. At this time, although the node G is at zero potential, the potential of a node J does not go zero correspondingly but becomes Vcc−Vth since a transistor Q7 turns ON, where Vth is the threshold value of the transistor Q7. Since the potential of the node H is Vcc, the potential of a node K becomes Vcc. Since the node I is at zero potential, a transistor Q9 turns ON and a transistor Q10 OFF, and consequently the potential of a node L becomes Vcc.

(2) Then, when the input goes zero, the potential of the node I changes to Vcc, turning OFF the transistor Q9 and ON the transistor Q10. Hence, the potential of the node L goes zero.

(3) Next, the potential of the node G changes to Vcc and the potential of the node J changes to Vcc+2Vth accordingly.

(4) Furthermore, the potential of the node H goes zero, but the potential of the node K does not go zero and remains at Vcc since the transistor Q8 is ON.

(5) Next, when the input becomes Vcc, the potential of the node I goes zero, turning ON the transistor Q9 and OFF the transistor Q10. In consequence, the node L is connected to the node K, and hence the potential of the former changes to Vcc.

(6) Then, the potential of the node G goes to zero, and the potential of the node J changes to Vcc−Vth accordingly.

(7) Further, the potential of the node H changes to Vcc, and the potentials of the nodes K and L both change to 2Vcc.

FIG. 15 shows the general outlines of timing when the double boost part is in the steady state. The node L and the output in FIG. 14 correspond to the nodes B and E in FIG. 12, respectively. The potentials of the nodes B and E in FIG. 12 are Vcc, whereas the potentials of the node L and the output in FIG. 14 are twice (2Vcc) higher than the power-supply voltage Vcc; therefore, the substrate bias circuit using the FIG. 12 circuit is called the single boost type and the substrate bias circuit using the FIG. 14 circuit is called the double boost type. In the double boost type circuit the potential difference between the gate and source of the transistor Q6 is larger than in the single boost type circuit, providing increased capability of supplying the internal voltage VBB.

As the working voltage lowers with the recent progress toward microminiaturization. The use of the single boost type substrate bias circuit encounters difficulties in supplying the internal voltage VBB. On the other hand, the use of the double boost type substrate bias circuit raises the potentials of the nodes K and L in the double boost part up to 2Vcc, incurring the possibility of breaking down gate oxide films of the transistors of the double boost part in the charge pump circuit.

SUMMARY OF THE INVENTION

It is therefore an object of the present invention to provide a semiconductor integrated circuit that is designed for higher reliability by holding the nodes K and L of the double boost part at potentials below 2Vcc to prevent breakdown of the gate oxide films of the transistors and for the use of the power-supply voltage Vcc over a wide voltage range.

According to an aspect of the present invention, there is provided a semiconductor integrated circuit that constitutes a charge pump circuit which uses a predetermined power-supply voltage and responds to a clock signal to provide an internal voltage different from the power-supply voltage, wherein the amplitude of a repetitive pulse, which is output from a double boost part, is made less than twice that of the power-supply voltage.

According to another aspect of the present invention, a first capacitor is connected to the double boost part, and the amplitude of the repetitive pulse from the double boost part is made less than twice that of the power-supply voltage through utilization of charge and discharge of the first capacitor by the clock signal.

According to another aspect of the present invention, the first capacitor is connected between the source of a p-channel transistor, which forms an inverter at the preceding stage of a second capacitor connected to the gate of the first transistor, and the ground.

According to another aspect of the present invention, the first capacitor is connected between the preceding stage of the second capacitor connected to the gate of the first transistor and the ground.

According to another aspect of the present invention, a plurality of first capacitors are connected to the double boost part via a plurality of fuses for laser trimming, and the amplitude of the repetitive pulse from the double boost part is made less than twice that of the power-supply voltage through utilization of charge and discharge of the plurality of first capacitors by the clock signal.

According to another aspect of the present invention, a plurality of first capacitors are connected to the double boost part via a plurality of transfer gates that are turned ON and OFF by predetermined control signals, and the amplitude of the repetitive pulse from the double boost part is made less than twice that of the power-supply voltage through utilization of charge and discharge of the plurality of first capacitors by the clock signal.

According to another aspect of the present invention, clamping circuits by a plurality of second transistors are connected to the double boost part, and the amplitude of the repetitive pulse from the double boost part is made less than twice that of the power-supply voltage.

According to another aspect of the present invention, the plurality of second transistors are connected between a p-channel transistor, which forms an inverter at the preceding stage of the second capacitor connected to the gate of the first transistor, and the power supply.

According to another aspect of the present invention, the plurality of second transistors are connected between the preceding stage of the second capacitor connected to the gate of the first transistor and the ground.

According to another aspect of the present invention, a second transistor is connected to the double boost part, and the amplitude of the repetitive pulse from the double boost part is made less than twice that of the power-supply voltage by controlling the second transistor with a predetermined control signal.

According to another aspect of the present invention, the second transistor is connected between the source of the p-channel transistor, which forms an inverter at the preceding stage of the second capacitor connected to the gate of the first transistor, and the ground.

According to another aspect of the present invention, the second transistor is connected between the preceding stage of the second capacitor connected to the gate of the first transistor and the ground.

According to another aspect of the present invention, a voltage drop is caused by a through current at the time of the ON/OFF operation of an inverter in the double boost part by the clock signal, by which the amplitude of the repetitive pulse from the double boost part is made less than twice that of the power-supply voltage.

According to another aspect of the present invention, a third transistor connected between the power supply and the inverter is provided in the double boost part, and a voltage drop is caused in the third transistor by a through current at the time of ON/OFF operation of the inverter by the clock signal.

According to another aspect of the present invention, the second transistor is connected to the double boost part, and the amplitude of the repetitive pulse from the double boost part is made less than twice that of the power-supply voltage by a voltage drop of the second transistor.

According to still another aspect of the present invention, the third transistor provided in the double boost part is connected to the power supply, and the second transistor is connected between the p-channel transistor, which forms an inverter at the preceding stage of the second capacitor connected to the gate of the first transistor, and the third transistor.

DETAILED DESCRIPTION OF THE PREFERRED EMBODIMENTS

EMBODIMENT 1

Figure 1:
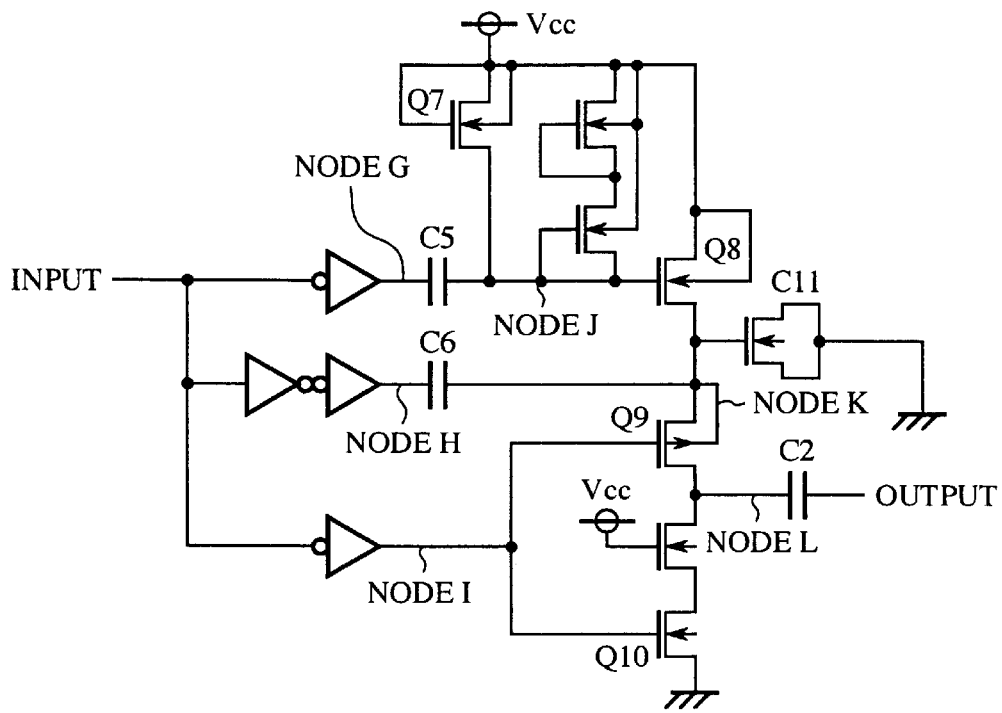
FIG. 1 is a diagram illustrating the configuration of a semiconductor integrated circuit according to a first embodiment of the present invention.

FIG. 1 is a circuit diagram of a semiconductor integrated circuit according to a first embodiment (Embodiment 1) of the present invention, which constitutes the double boost part in the double boost type charge pump circuit. This embodiment is identical in construction with the FIG. 14 prior art example except that a capacitor (a first capacitor) C11 is connected between a node K, that is, the source of a p-channel transistor Q9, and the ground. The capacitor C11 is formed by an n-channel transistor.

Figure 14:
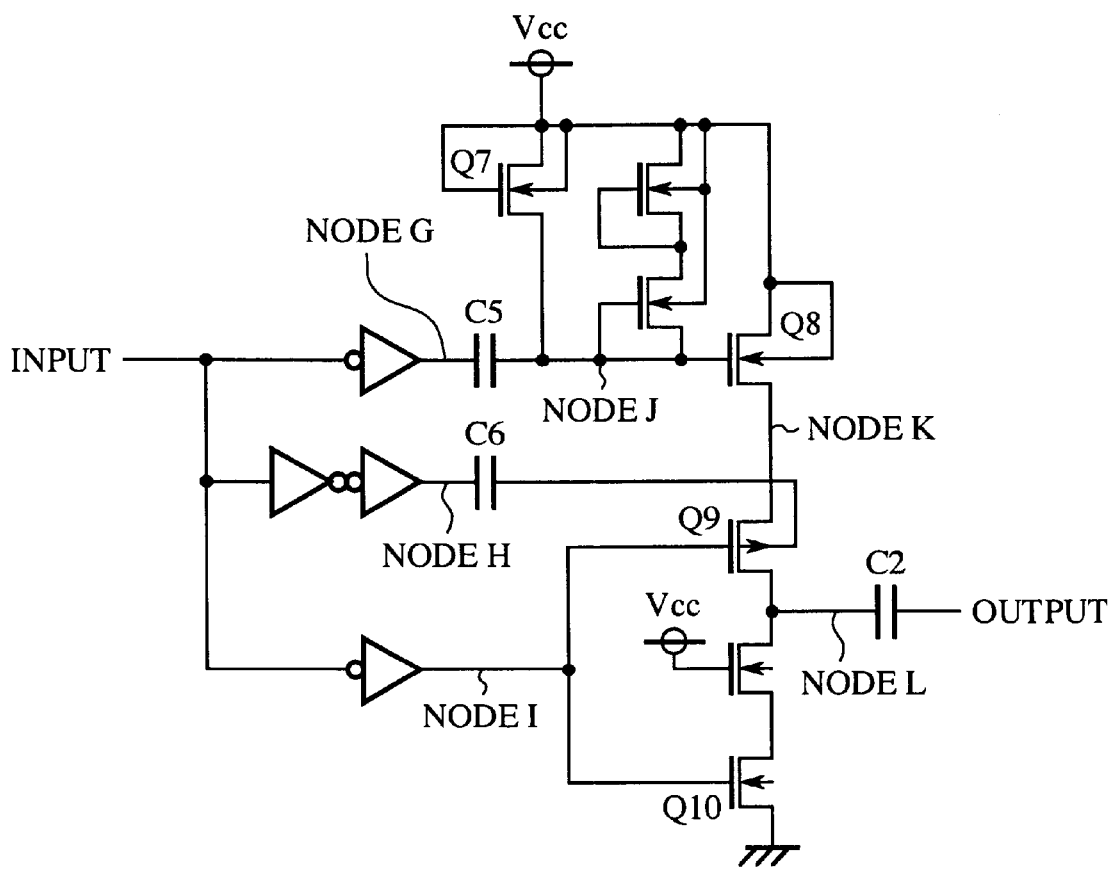
FIG. 14 is a diagram depicting the configuration of another conventional semiconductor integrated circuit.
Figure 15:
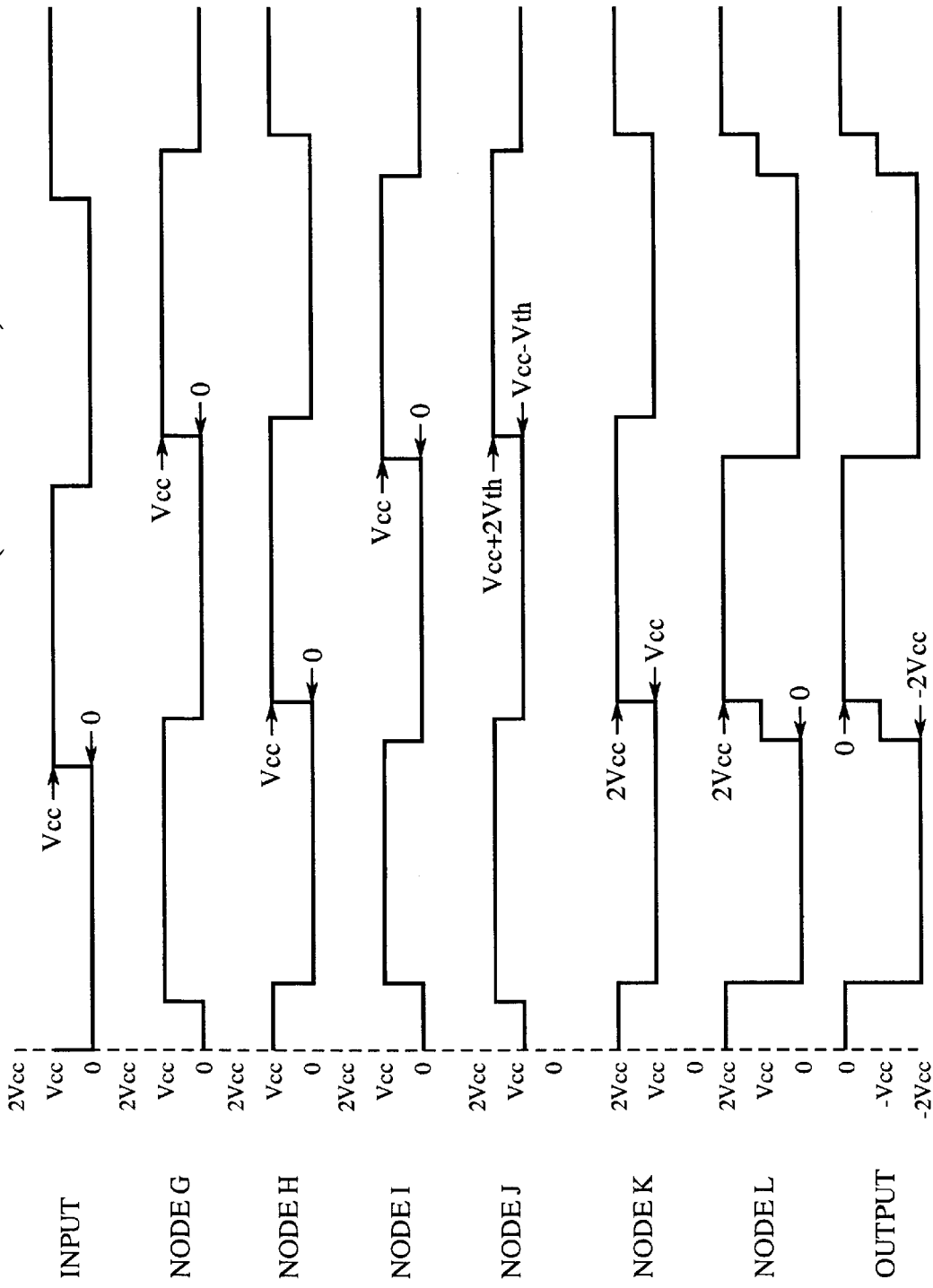
FIG. 15 is a waveform diagram showing the operation timing of the conventional semiconductor circuit depicted in FIG. 14.

In the prior art example of FIG. 14, since the capacitor C11 is not connected to the node K, the voltage 2Vcc charge in the node K by the capacitor C6 appears intact in the node L. In this embodiment, however, since the n-channel capacitor C1 is connected in parallel to the node K, the voltage charged in the capacitor C11 by the capacitor C6 appears in the node K and also in the node L connected thereto.

Letting Vx represent the voltage after the supply of charges to the capacitor C11 by the capacitor C6, the voltage of the node K has an amplitude in the range of between Vcc and Vx. Since the capacitor C11 is always in the ON state, it has stored therein charges of Vcc from the beginning, and when the voltage of the node K is Vx, the capacitor C11 is charged from Vcc to Vx, whereas when the voltage of the node k is Vcc, it is discharged from Vx to Vcc.

An equation that expresses this relationship is given by (Charged stored before connection)=(charges after connection).

In terms of the capacitors C6 and C11, it follows that $C6 \times (2Vcc-Vcc) = C6 \times (Vx-Vcc) + (Vx-Vcc) \times C11$.

And the voltage of the node K is given by $Vx = (2 \times C6 + C11) \times Vcc/(C6+C11)$.

Assuming that the capacitor C11 has a capacitor size ⅓ that of the capacitor C6, Vx=1.75×Vcc; therefore, the charge pump circuit of this embodiment provides a 1.75-fold boost of the power-supply voltage Vcc. By selectively changing the size of the capacitor C11, it is possible to make the charge pump circuit perform a less-than-twice boosting operation and hold the amplitude of the output signal from the double boost part in the range of between the voltages Vcc and 2Vcc.

As described above, according to this embodiment, the double boost part of the charge pump circuit can be set at an arbitrary value of voltage between Vcc and 2Vcc through utilization of the charge and discharge of the capacitor C11 connected to the node K. This provides an adequate margin of safety against the breakdown of the gate oxide films of transistors experienced in the prior art wherein the transistors Q9 and Q10 generate the potential difference of 2Vcc and the capacitor C2 generates an arbitrary potential difference only below 2Vcc. Hence, this embodiment provides increased reliability and permits the use of the power-supply voltage Vcc over a wider voltage range.

Moreover, this embodiment avoids, by the additional provision of the capacitor C11, the necessity for an internal step-down circuit required in the past to prevent the oxide film breakdown. This reduces the circuit area, and hence raises the chip yield rate and also decreases power consumption.

EMBODIMENT 2

Figure 2:
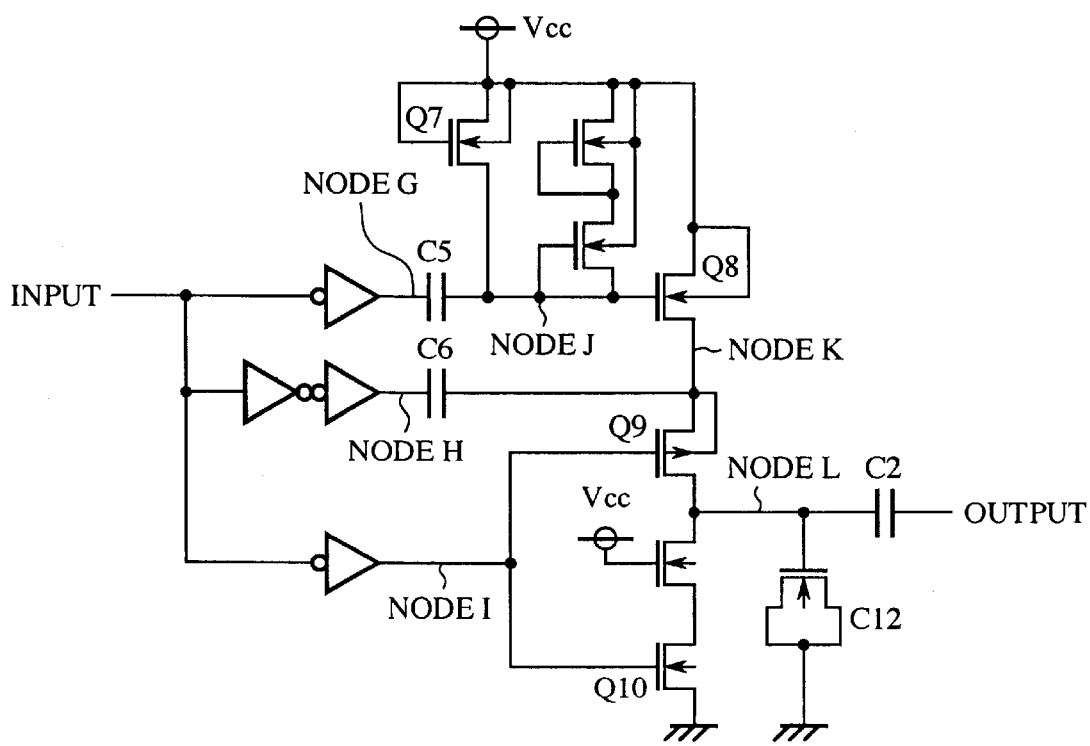
FIG. 2 is a diagram illustrating the configuration of a semiconductor integrated circuit according to a second embodiment of the present invention.

FIG. 2 illustrates the configuration of a semiconductor integrated circuit according to a second embodiment (Embodiment 2) of the present invention, which constitutes the double boost part in the double boost type charge pump circuit. This embodiment is identical in construction with the FIG. 14 prior art example except that a capacitor (a first capacitor) C12 is connected between the node L, i.e. the preceding stage of a capacitor C2 (a second capacitor), and the ground. The capacitor C12 is formed by an n-channel transistor.

Conventionally, since the capacitor C12 is not connected to the node L, the voltage 2Vcc stored in the node K appears intact in the node L. In this embodiment, however, since the n-channel capacitor C12 is connected in parallel to the node L, the former needs to be charged using the voltage 2Vcc to be charged in the node K when the nodes K and L are connected.

In Embodiment 1, the capacitor C11 is connected to the node K, and hence it is charged with charges of at least the voltage Vcc, but in this embodiment, since the potential of the node L is in the range of 0 to Vx (where Vx is the voltage when the nodes K and L are connected), the capacitor C12 is completely discharged.

Accordingly, this relationship is expressed by $$C6 \times (2Vcc - Vcc) = C6 \times (Vx - Vcc) + C12 \times Vx.$$

And the voltage when the nodes K and L are connected is given by $$Vx = C6 \times 2Vcc/(C6 + C12).$$

Assuming that the capacitor C12 has a capacity ⅓ that of the capacitor C6, Vx=1.5×Vcc; therefore, the charge pump circuit of this embodiment provides a 1.5-fold boost of the power-supply voltage Vcc. By selectively changing the size of the capacitor C12, it is possible to make the charge pump circuit perform a boosting operation in the range of between the voltages Vcc and 2Vcc.

As described above, according to this embodiment, the double boost part of the charge pump circuit can be set at an arbitrary value of voltage between Vcc and 2Vcc through utilization of the charge and discharge of the capacitor C12 connected to the node L. This provides an adequate margin of safety against the breakdown of the gate oxide films of transistors experienced in the prior art wherein the transistors Q9 and Q10 generate the potential difference of 2Vcc and the capacitor C2 generates an arbitrary potential difference only below 2Vcc. Hence, this embodiment provides increased reliability and permits the use of the power-supply voltage Vcc over a wider voltage range.

Moreover, this embodiment avoids, by the additional provision of the capacitor C12, the necessity for an internal step-down circuit required in the past to prevent the oxide film breakdown. This reduces the circuit area, and hence raises the chip yield rate and also decreases power consumption.

Besides, according to this embodiment, since the potential of the node L is in the range of 0 to Vcc, the charges stored in the capacitor C12 are all discharged. This means that the capacitor C12 must be charged correspondingly, and the voltage drop in this case is larger than in the case where the capacitor C11 is connected to the node K; hence, it is possible to reduce the size of the capacitor C12 accordingly.

EMBODIMENT 3

Figure 3:
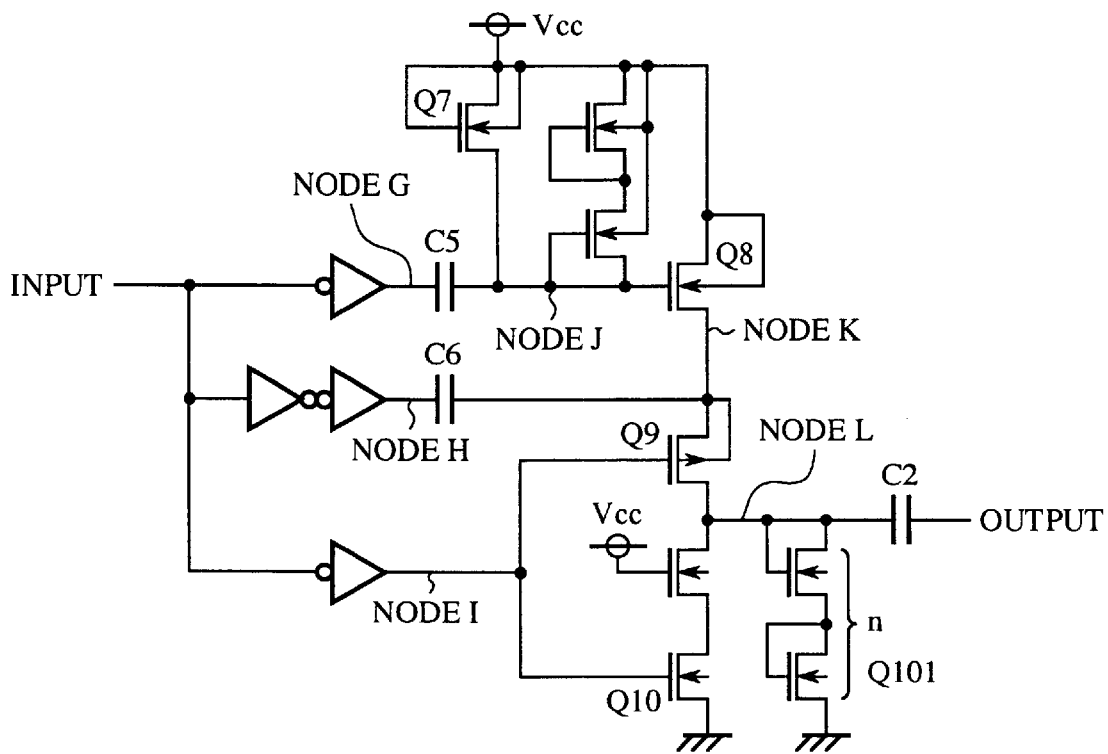
FIG. 3 is a diagram illustrating the configuration of a semiconductor integrated circuit according to a third embodiment of the present invention.

FIG. 3 illustrates the configuration of a semiconductor integrated circuit according to a third embodiment (Embodiment 3) of the present invention, which constitutes the double boost part in the double boost type charge pump circuit. This embodiment is identical in construction with the FIG. 14 prior art example except that a plurality n of transistors (second transistors) Q101 are connected, as a clamping circuit, between the node L, i.e. the preceding stage of the capacitor C2, and the ground. The transistors Q101 are each an n-channel transistor.

The number n of transistors Q101 needs to satisfy the condition $$Vcc < n \times Vth < 2Vcc,$$

where Vth is the threshold value of each transistor Q101.

In the prior art example of FIG. 14 the potential of the node L is in the range of 0 to 2Vcc, but in this embodiment, when the above-mentioned condition is fulfilled, the transistors Q101 function as a clamping circuit to clamp the potential of the node L to n×Vth when the node L is connected to the node K. Accordingly, by changing the number n of transistors Q101 to meet the above-mentioned condition, it is possible to achieve the boost operation in the range of between Vcc and 2Vcc.

As described above, according to this embodiment, the double boost part of the charge pump circuit can be set at an arbitrary value of voltage between Vcc and 2Vcc by connecting the transistors Q101 as a clamping circuit to the node L. This reduces the potential difference of 2Vcc by the transistors Q9 and Q10 and the potential difference of the capacitor C2 that would be generated in the prior art example; in consequence, an adequate margin of safety is provided against the breakdown of the gate oxide films of transistors experienced in the prior art. Hence, this embodiment provides increased reliability and permits the use of the power-supply voltage Vcc over a wider voltage range.

Moreover, this embodiment avoids, by the additional provision of the n transistors Q101, the necessity for an internal step-down circuit required in the past to prevent the oxide film breakdown. This reduces the circuit area, and hence raises the chip yield rate and also decreases power consumption.

Besides, according to this embodiment, since voltage control can be effected only in terms of the threshold value Vth of each transistor, the degree of freedom in setting voltage is low accordingly, but the circuit area can be made smaller than in Embodiments 1 and 2 that use the capacitors C11 and C12, respectively.

EMBODIMENT 4

Figure 4:
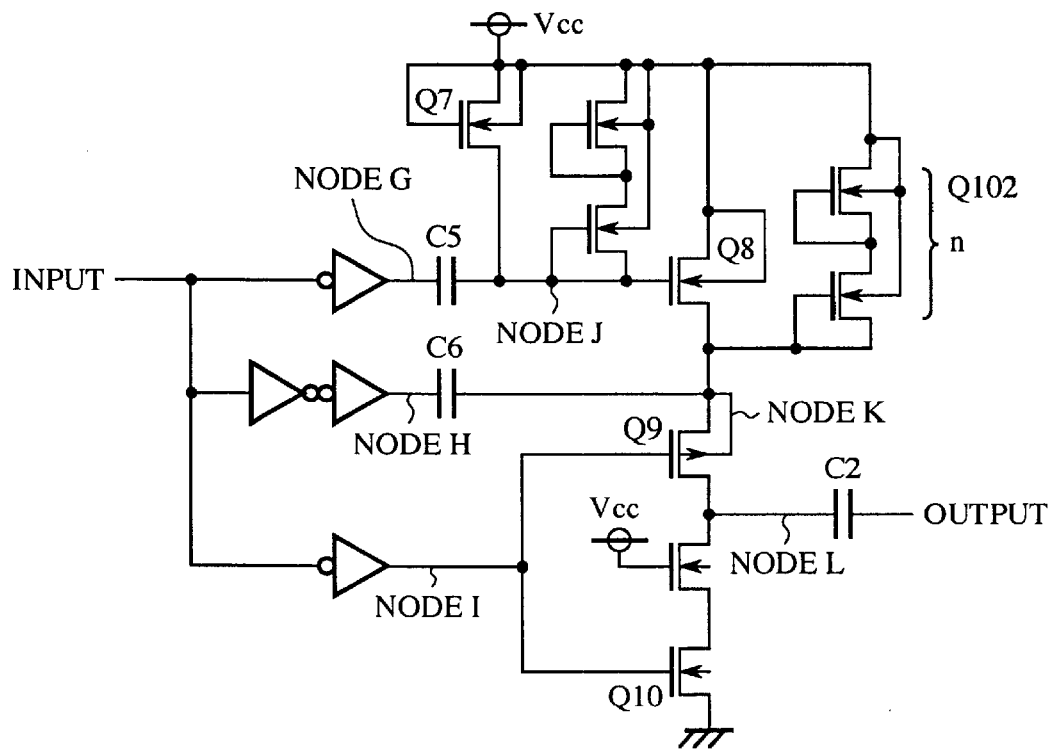
FIG. 4 is a diagram illustrating the configuration of a semiconductor integrated circuit according to a fourth embodiment of the present invention.

FIG. 4 illustrates the configuration of a semiconductor integrated circuit according to a fourth embodiment (Embodiment 4) of the present invention, which constitutes the double boost part in the double boost type charge pump circuit. This embodiment is identical in construction with the FIG. 14 prior art example except that a plurality n of transistors (second transistors) Q102 are connected, as a clamping circuit, between the node K, i.e. the source of the p-channel transistor Q9, and the power supply Vcc. The transistors Q102 are each an n-channel transistor.

The number n of transistors Q102 needs to satisfy the condition $$Vcc < n \times Vth + Vcc < 2Vcc,$$

where Vth is the threshold value of each transistor Q101.

In the prior art example of FIG. 14 the potential of the node K is in the range of Vcc to 2Vcc, but in this embodiment, when the above-mentioned condition is fulfilled, the transistors Q102 function as a clamping circuit to clamp the potential of the node K to n×Vth+Vcc. Accordingly, by changing the number n of transistors Q102 to meet the above-mentioned condition, it is possible to achieve the boost operation in the range of between Vcc and 2Vcc.

As described above, according to this embodiment, the double boost part of the charge pump circuit can be set at an arbitrary value of voltage between Vcc and 2Vcc by connecting the n transistors Q102 as a clamping circuit to the node K. This reduces the potential difference of 2Vcc by the transistors Q9 and Q10 and the potential difference of the capacitor C2 that would be generated in the prior art example; in consequence, an adequate margin of safety is provided against the breakdown of the gate oxide films of transistors experienced in the prior art. Hence, this embodiment provides increased reliability and permits the use of the power-supply voltage Vcc over a wider voltage range.

Moreover, this embodiment avoids, by the additional provision of the n transistors Q102, the necessity for an internal step-down circuit required in the past to prevent the oxide film breakdown. This reduces the circuit area, and hence raises the chip yield rate and also decreases power consumption.

Besides, in Embodiment 3 the transistors Q101 are clamped at the ground potential, whereas in this embodiment, since they are clamped at the power-supply voltage Vcc, the number of transistors can be decreased accordingly, permitting reduction of the circuit area.

EMBODIMENT 5

Figure 5:
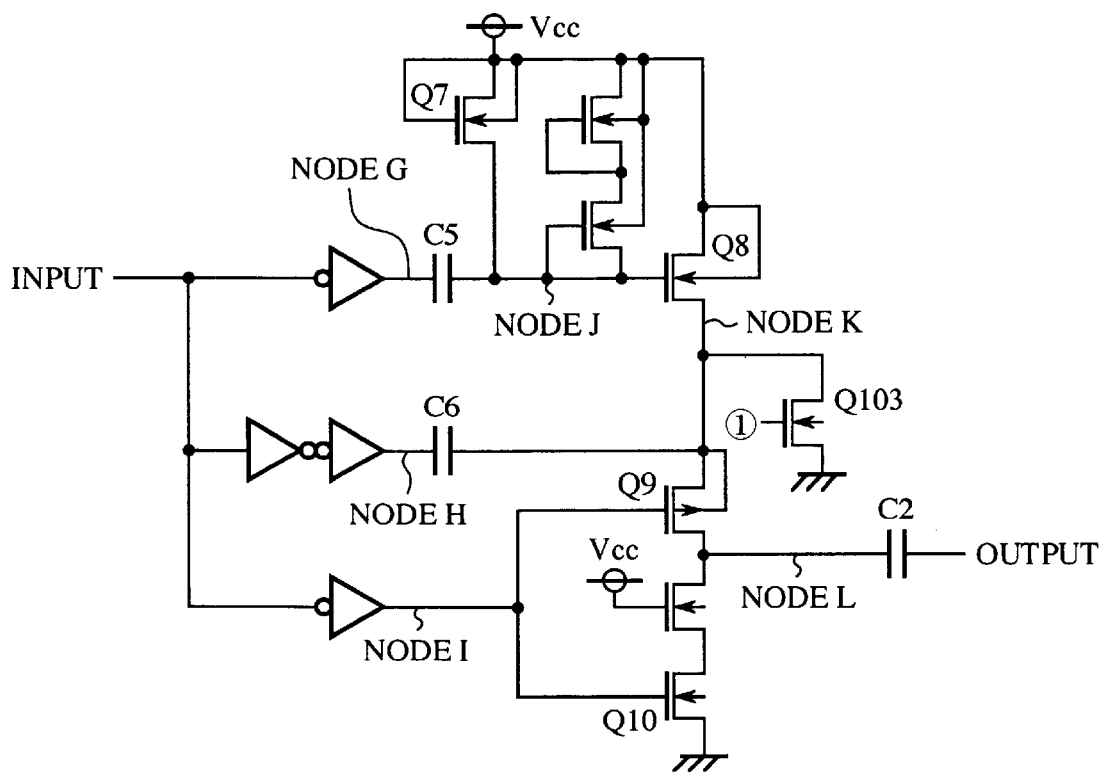
FIG. 5 is a diagram illustrating the configuration of a semiconductor integrated circuit according to a fifth embodiment of the present invention.

FIG. 5 illustrates the configuration of a semiconductor integrated circuit according to a fifth embodiment (Embodiment 5) of the present invention, which constitutes the double boost part in the double boost type charge pump circuit. This embodiment is identical in construction with the FIG. 14 prior art example except that an n-channel transistor (a second transistor) Q103 is connected between the node K, i.e. the source of the p-channel transistor Q9, and the ground.

The transistor Q103 is connected at its drain to the node K and at its source to the ground, and is supplied at the gate with a predetermined control signal (1). When the potential of the node K is going to become Vcc, the predetermined control signal (1) is applied to the transistor Q103 to hold it ON for a predetermined time to thereby connect the node K to the ground for a predetermined time, during which charges stored in the capacitor C6 are discharged, and as a result, the voltage of the node K drops accordingly. Therefore, by controlling the time for which to keep the transistor Q103 ON, a boost operation in the range of between Vcc and 2Vcc can be performed.

As described above, according to this embodiment, the double boost part of the charge pump circuit can be set at an arbitrary value of voltage between Vcc and 2Vcc by holding the transistor Q103 in the ON state for a predetermined time by the predetermined control signal (1) to lower the voltage of the node K. This reduces the potential difference of 2Vcc by the transistors Q9 and Q10 and the potential difference of the capacitor C2 that would be generated in the prior art example; in consequence, an adequate margin of safety is provided against the breakdown of the gate oxide films of transistors experienced in the prior art. Hence, this embodiment provides increased reliability and permits the use of the power-supply voltage Vcc over a wider voltage range.

Moreover, this embodiment avoids, by the additional provision of the transistor Q103, the necessity for an internal step-down circuit required in the past to prevent the oxide film breakdown. This reduces the circuit area, and hence raises the chip yield rate and also decreases power consumption.

EMBODIMENT 6

Figure 6:
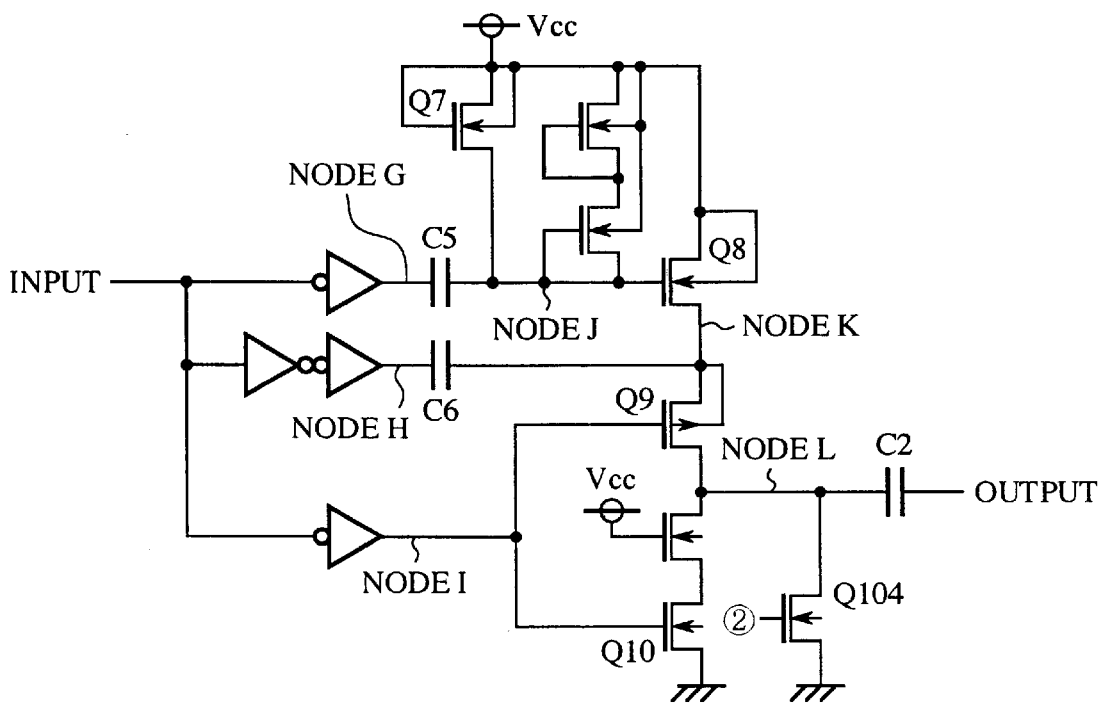
FIG. 6 is a diagram illustrating the configuration of a semiconductor integrated circuit according to a sixth embodiment of the present invention.

FIG. 6 illustrates the configuration of a semiconductor integrated circuit according to a sixth embodiment (Embodiment 6) of the present invention, which constitutes the double boost part in the double boost type charge pump circuit. This embodiment is identical in construction with the FIG. 14 prior art example except that an n-channel transistor (a second transistor) Q104 is connected between the node L, i.e. the preceding stage of the capacitor C2, and the ground.

The transistor Q104 is connected at its drain to the node K and at its source to the ground, and is supplied at the gate with a predetermined control signal (2). When the potential of the node K is going to become 2Vcc, the predetermined control signal (2) is applied to the transistor Q104 to hold it ON for a predetermined time to thereby connect the node L to the ground for a predetermined time, during which charges stored in the capacitor C6 are discharged, and as a result, the voltage of the node L drops accordingly. Therefore, by controlling the time for which to keep the transistor Q103 ON, a boost operation in the range of between Vcc and 2Vcc can be performed.

As described above, according to this embodiment, the double boost part of the charge pump circuit can be set at an arbitrary value of voltage between Vcc and 2Vcc by holding the transistor Q104 in the ON state for a predetermined time by the predetermined control signal (2) to lower the voltage of the node L. This reduces the potential difference of 2Vcc by the transistors Q9 and Q10 and the potential difference of the capacitor C2 that would be generated in the prior art example; in consequence, an adequate margin of safety is provided against the breakdown of the gate oxide films of transistors experienced in the prior art. Hence, this embodiment provides increased reliability and permits the use of the power-supply voltage Vcc over a wider voltage range.

Moreover, this embodiment avoids, by the additional provision of the transistor Q104, the necessity for an internal step-down circuit required in the past to prevent the oxide film breakdown. This reduces the circuit area, and hence raises the chip yield rate and also decreases power consumption.

EMBODIMENT 7

Figure 7:
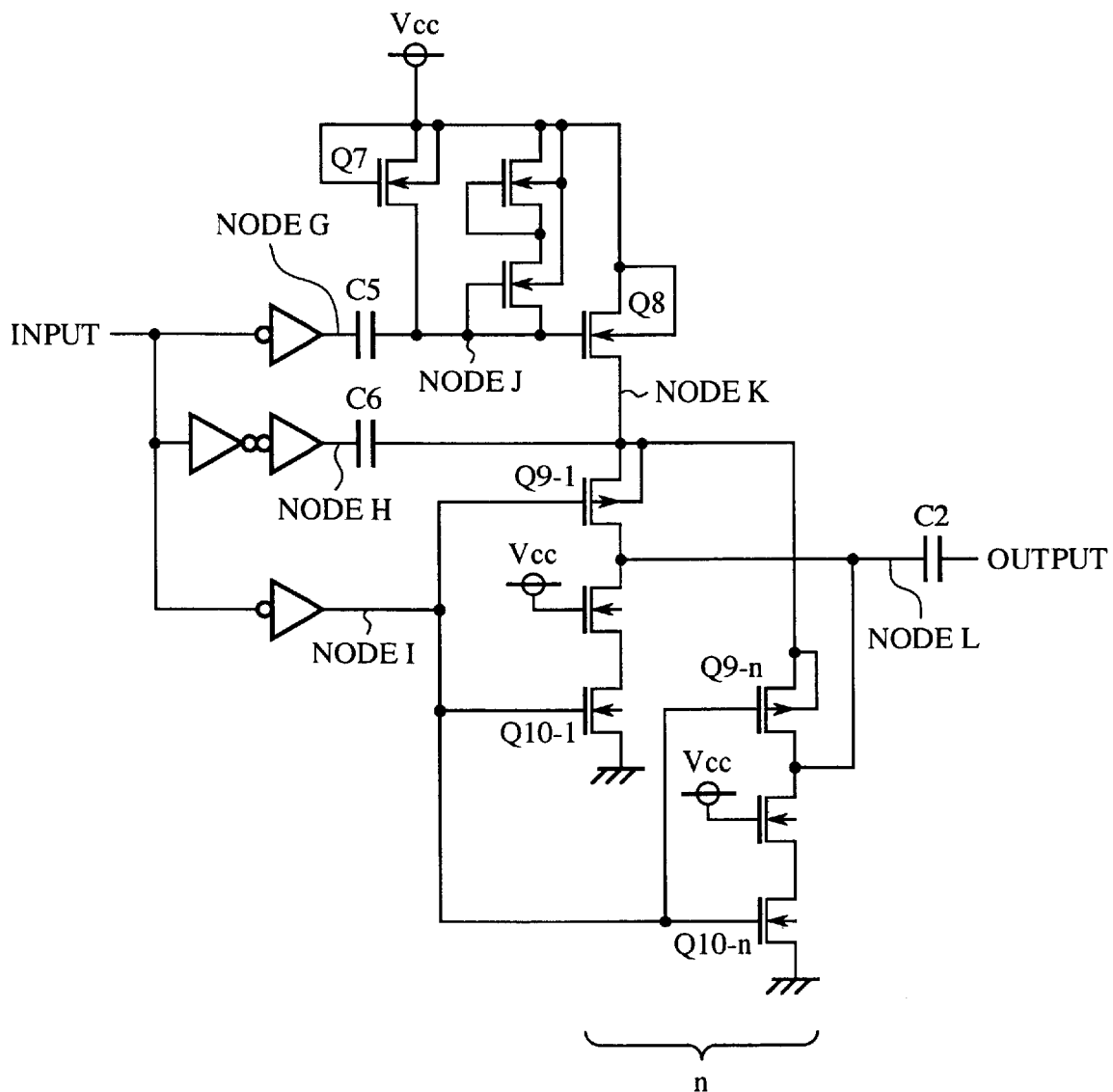
FIG. 7 is a diagram illustrating the configuration of a semiconductor integrated circuit according to a seventh embodiment of the present invention.

FIG. 7 illustrates the configuration of a semiconductor integrated circuit according to a seventh embodiment (Embodiment 7) of the present invention, which constitutes the double boost part in the double boost type charge pump circuit. This embodiment is identical in construction with the FIG. 14 prior art example except that the inverters formed by the transistors Q9 and Q10 in FIG. 14 are substituted with inverters by parallel connections of n inverters formed by transistors Q9-1, Q10-1 to Q9-n, Q10-n.

In the prior art example of FIG. 14, when the inputs to the inverters by the transistors Q9 and Q10 changes from Vcc to 0, through currents develop in the process of reversing the outputs, but since a transistor Q8 is ON, the potential of the node K becomes equal to the power-supply voltage Vcc, and hence no voltage drop occurs.

According to this embodiment, in the state in which the transistor Q8 (a third transistor) is held OFF under timing control, the inverters formed by the transistors Q9-1, Q10-1 to Q9-n, Q10-n are reversed to generate through currents, by which charges stored in the capacitor C6 are discharged to cause a voltage drop. Thus, according to this embodiment, by connecting n inverters in parallel to cause a required voltage drop, it is possible to develop the voltage drop by n through currents. Accordingly, it is possible to implement the boost operation in the range of Vcc to 2Vcc by adusting the number of inverters so that the potential of the node K goes above Vcc.

As described above, according to this embodiment, the double boost part of the charge pump circuit can be set at an arbitrary value of voltage between Vcc and 2Vcc by connecting the transistors Q9-1, Q10-1 to Q9-n, Q10-n in parallel to cause a voltage drop by through currents at the time of reversing them. This reduces the potential difference of 2Vcc by the transistors Q9 and Q10 and the potential difference of the capacitor C2 that would be generated in the prior art example; in consequence, an adequate margin of safety is provided against the breakdown of the gate oxide films of transistors experienced in the prior art. Hence, this embodiment provides increased reliability and permits the use of the power-supply voltage Vcc over a wider voltage range.

Moreover, by the parallel connection of n inverters formed by the transistors Q9-1, Q10-1 to Q9-n, Q10-n, this embodiment avoids the necessity for an internal step-down circuit required in the past to prevent the oxide film breakdown. This reduces the circuit area, and hence raises the chip yield rate and also decreases power consumption.

EMBODIMENT 8

Figure 8:
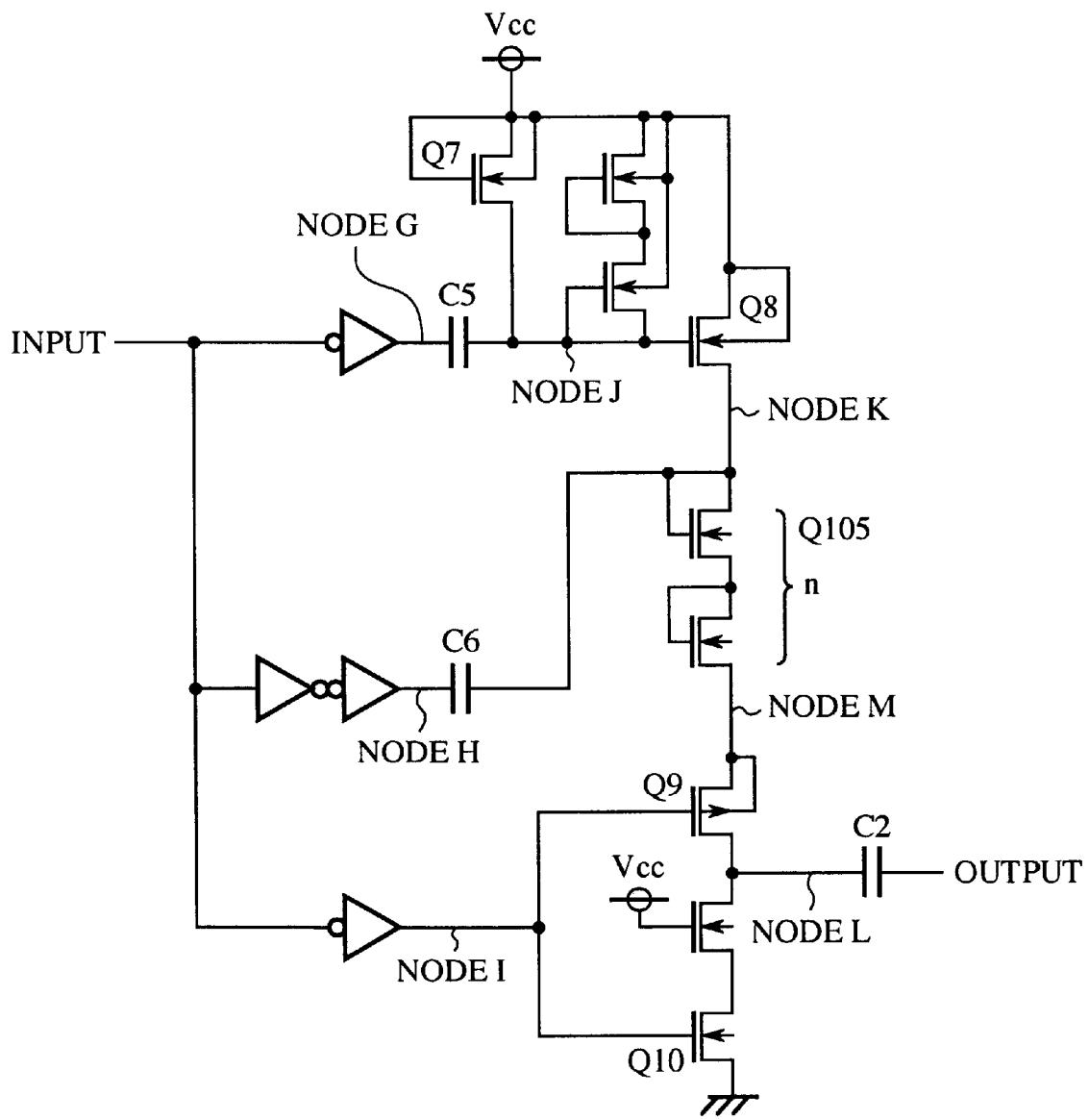
FIG. 8 is a diagram illustrating the configuration of a semiconductor integrated circuit according to an eighth embodiment of the present invention.

FIG. 8 illustrates the configuration of a semiconductor integrated circuit according to an eighth embodiment (Embodiment 8) of the present invention, which constitutes the double boost part in the double boost type charge pump circuit. This embodiment is identical in construction with the FIG. 14 prior art example except that a plurality n of transistors (second transistors) Q105 are connected between a node M, i.e. the source of the p-channel transistor Q9, and the drain of a transistor (a third transistor) Q8. The transistors Q105 are each an n-channel transistor with their source and gate interconnected.

The number n of transistors Q105 needs to satisfy the condition $$Vcc < 2Vcc - n \times Vth < 2Vcc,$$

where Vth is the threshold value of each transistor Q101.

When this condition is satisfied, the voltage of the node M can be lowered by Vth upon each connection of a transistor. By selecting the number of transistors Q105 to meet the condition, it is possible to implement the boost operation in the range of between Vcc and 2Vcc–Vth.

As described above, according to this embodiment, the double boost part of the charge pump circuit can be set at an arbitrary value of voltage between Vcc and 2Vcc–Vth by connecting the n transistors Q105 between the transistors Q8 and Q9. This reduces the potential difference of 2Vcc by the transistors Q9 and Q10 and the potential difference of the capacitor C2 that would be generated in the prior art example; in consequence, an adequate margin of safety is provided against the breakdown of the gate oxide films of transistors experienced in the prior art. Hence, this embodiment provides increased reliability and permits the use of the power-supply voltage Vcc over a wider voltage range.

Moreover, this embodiment avoids, by the additional provision of the transistors Q105, the necessity for an internal step-down circuit required in the past to prevent the oxide film breakdown. This reduces the circuit area, and hence raises the chip yield rate and also decreases power consumption.

EMBODIMENT 9

Figure 9:
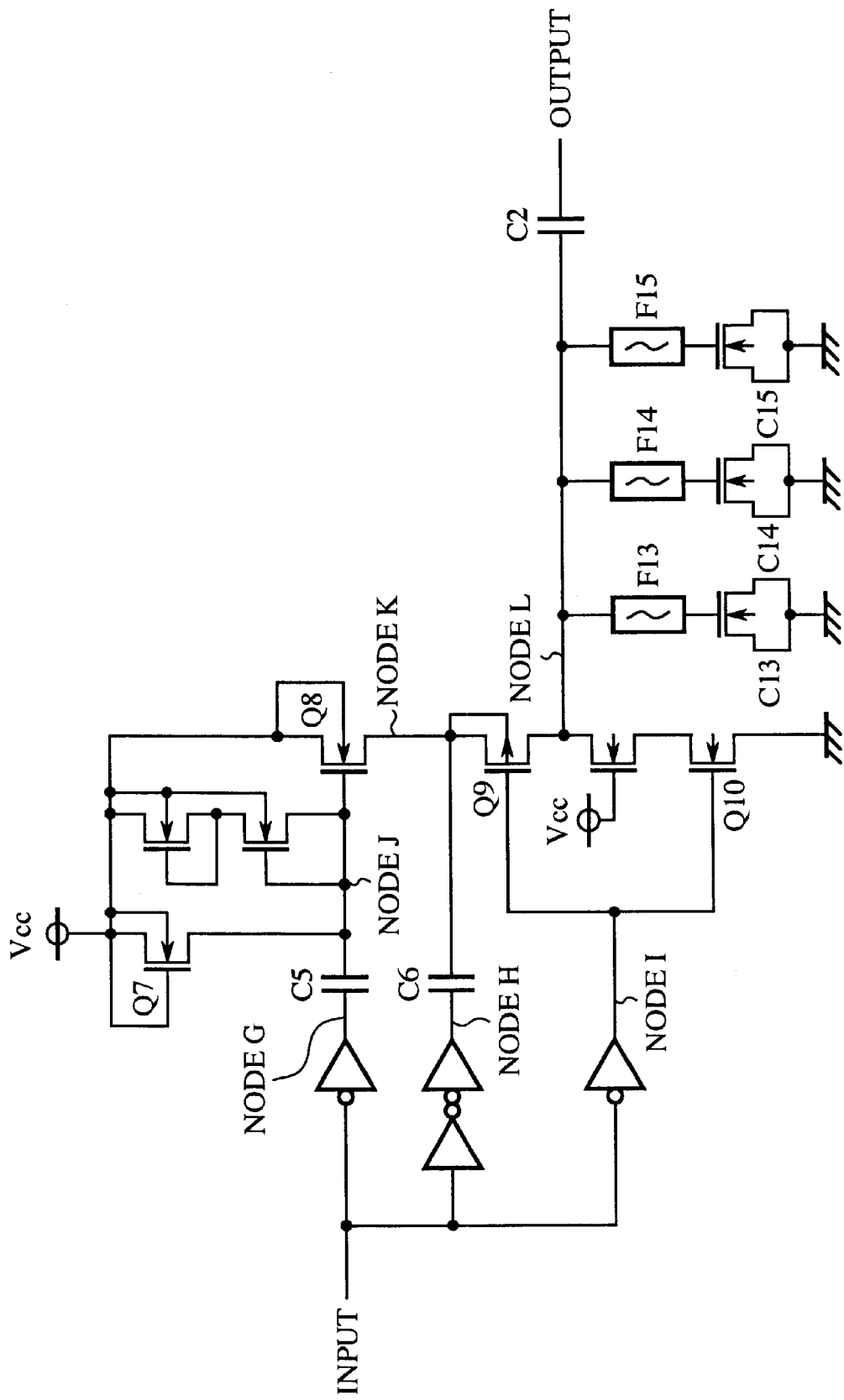
FIG. 9 is a diagram illustrating the configuration of a semiconductor integrated circuit according to a ninth embodiment of the present invention.

FIG. 9 illustrates the configuration of a semiconductor integrated circuit according to a ninth embodiment (Embodiment 9) of the present invention, which constitutes the double boost part in the double boost type charge pump circuit. Reference numerals F13, F14 and F15 denote fuses for laser trimming use connected to the node L, that is, to the preceding stage of a capacitor C2 (a second capacitor); and C13, C14 and C15 denote capacitors (first capacitors) connected to the node L via the fuses F13, F14 and F15, respectively. This embodiment is identical in construction with the FIG. 14 prior art example except the above. The capacitors C13, C14 and C15 are each formed by an n-channel transistor.

Assuming that the capacitor C13 has a capacity ⅓ that of the capacitor C6 and that C13=C14=C15, when none of the fuses F13, F14 and F15 are disconnected from the node L, its voltage Vx becomes Vcc. When any one of the fuses is disconnected, Vx=1.2Vcc; when two fuses are disconnected, Vx=1.5Vcc; and the three fuses are all disconnected, Vx=2Vcc.

As described above, according to this embodiment, it is possible to obtain the same results as obtainable with Embodiment 2, and the laser trimming that carries out connection/disconnection of the fuses F13, F14 and F15 by using the circuit configuration of FIG. 9 controls the capability of supplying the internal voltage VBB; since ICs rejected as defective so far owing to insufficient voltage supply capability can be made nondefective, the yield of ICs under test can be improved.

Figure 11:
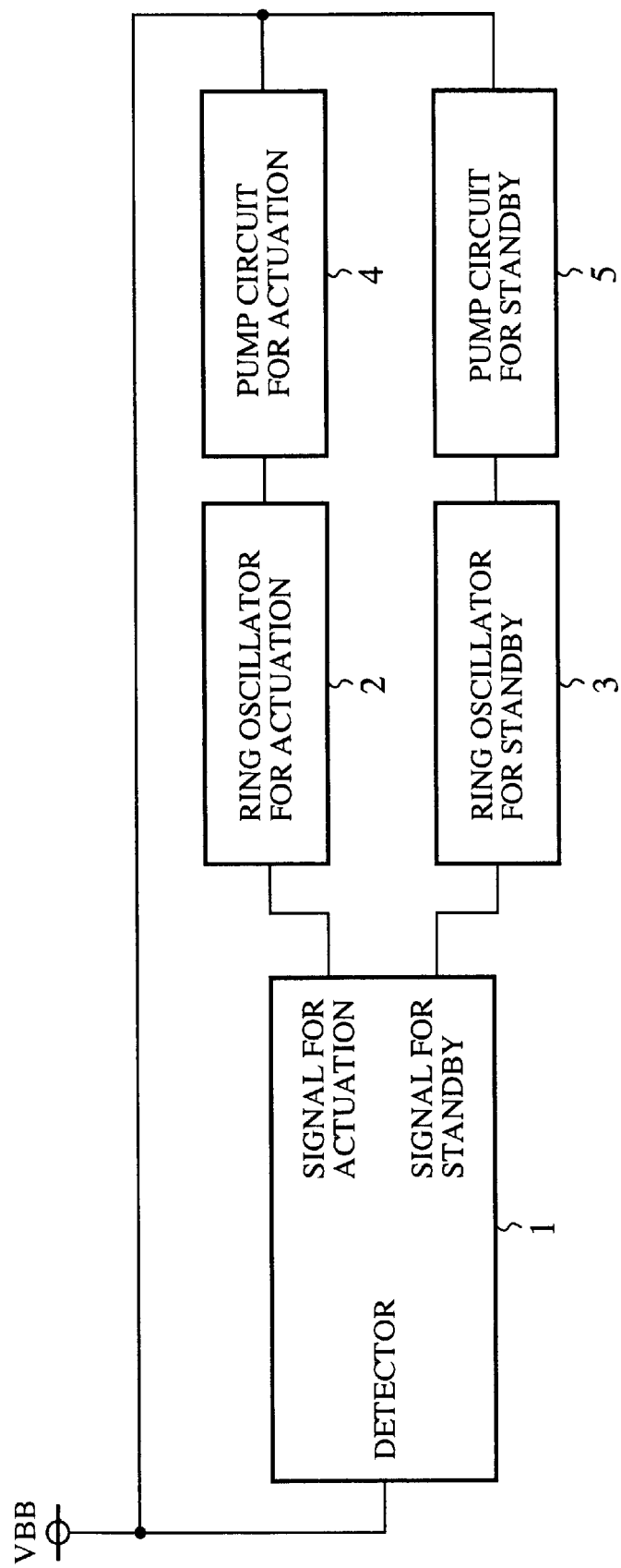
FIG. 11 is a block diagram depicting the configuration of a conventional substrate bias circuit.
Figure 12:
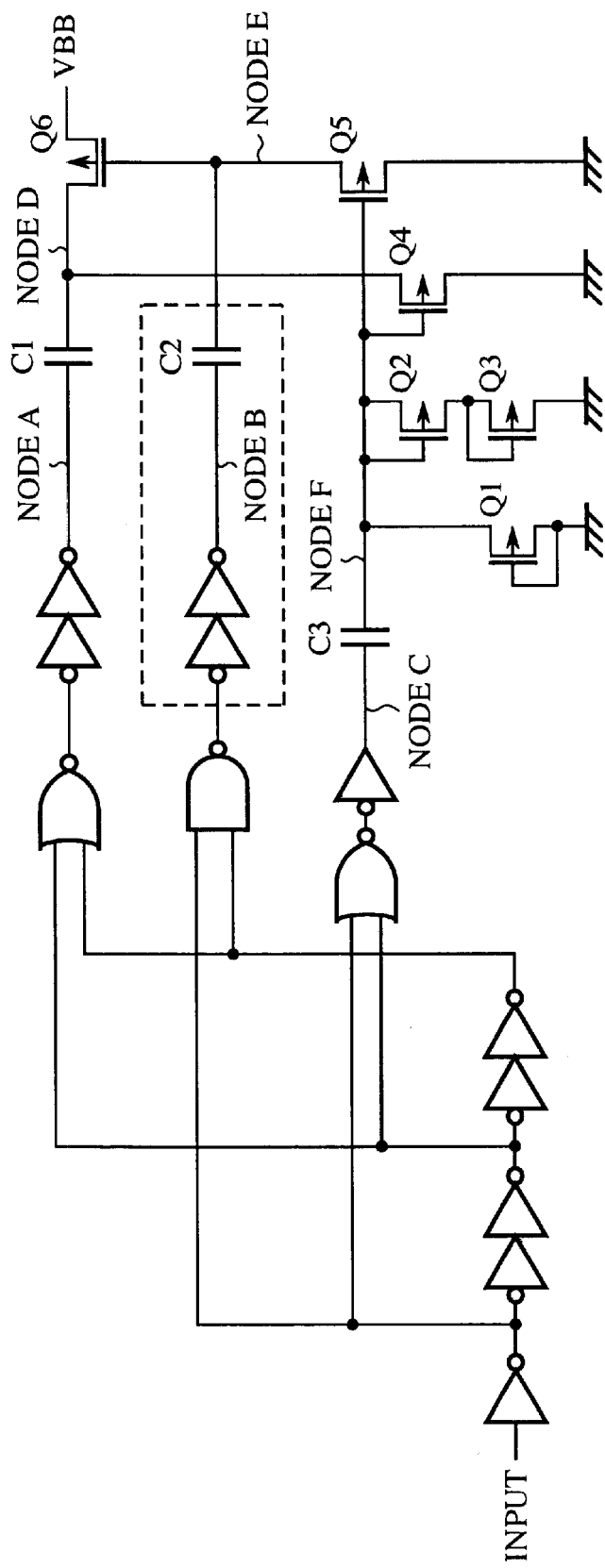
FIG. 12 is a diagram depicting the configuration of a conventional semiconductor integrated circuit.
Figure 13:
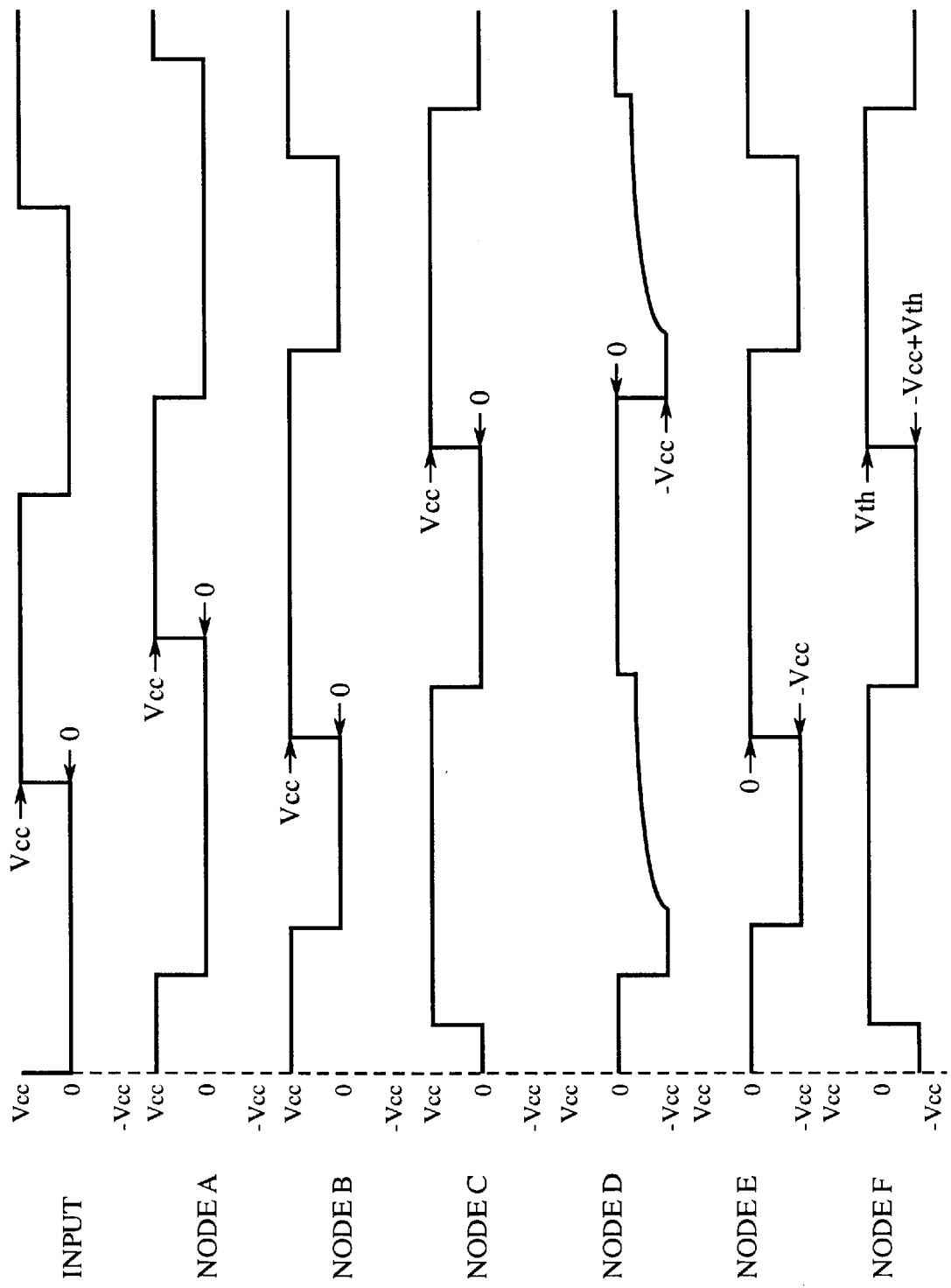
FIG. 13 is a waveform diagram showing the operation timing of the conventional semiconductor integrated circuit depicted in FIG. 12.

Moreover, this embodiment could provides increased IC yield rate by using the laser trimming mechanism in combination with the level for detecting the internal voltage VBB in the detector 1 depicted in FIG. 11 prior art example.

While in this embodiment the capacitors C13, C14 and C15 are connected between the preceding stage of the capacitor C2 (the node L) and the ground via the fuses F13, F14 and F15, the capacitors C13, C14 and C15 may also be connected via the fuses F13, F14 and F15 between the source of the p-channel transistor Q9, which constitutes an inverter at the preceding stage of the capacitor C2 (the node K), and the ground.

EMBODIMENT 10

Figure 10:
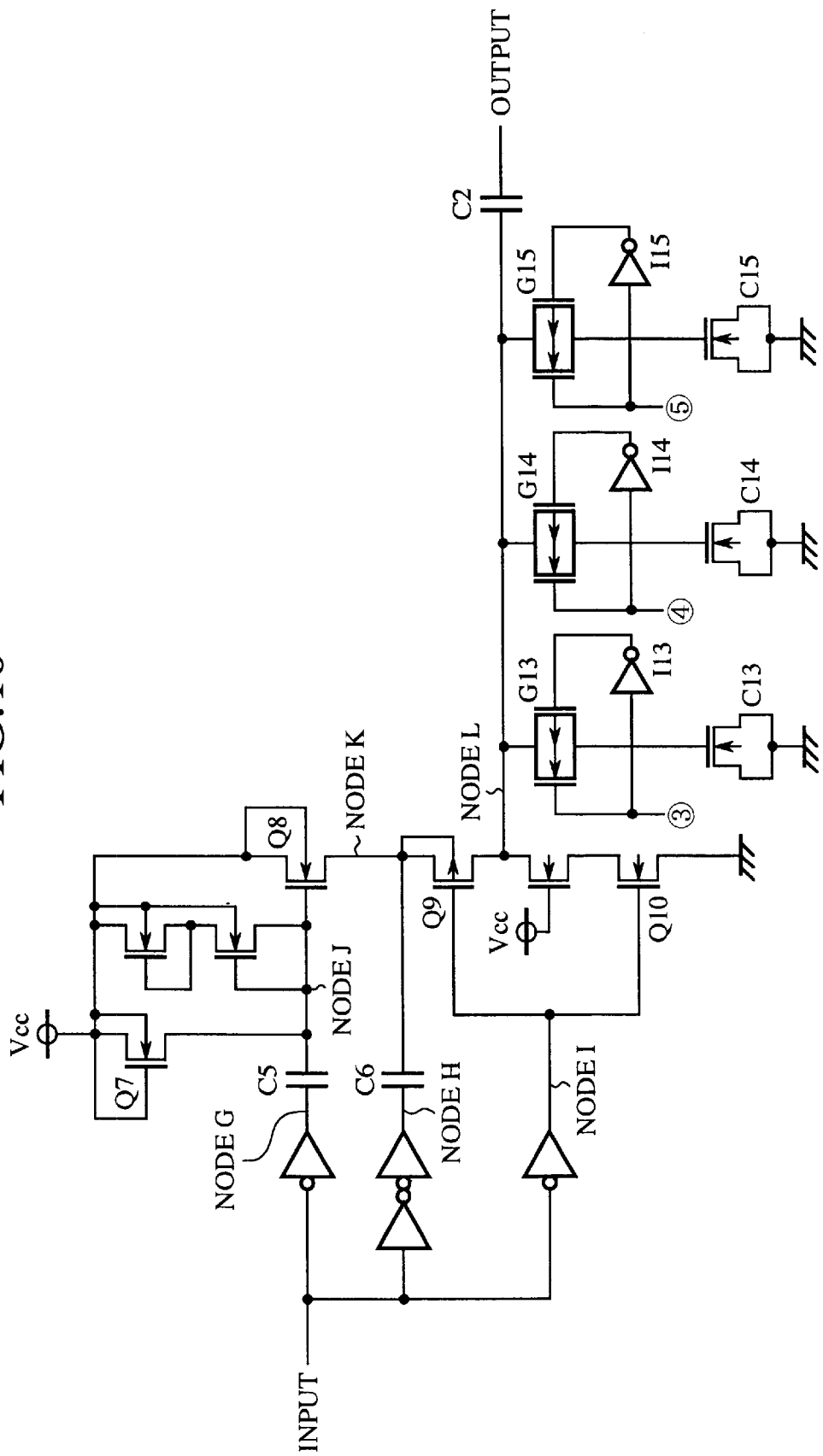
FIG. 10 is a diagram illustrating the configuration of a semiconductor integrated circuit according to a tenth embodiment of the present invention.

FIG. 10 illustrates the configuration of a semiconductor integrated circuit according to a tenth embodiment (Embodiment 10) of the present invention, which constitutes the double boost part in the double boost type charge pump circuit. Reference numerals G13, G14 and G15 denote transfer gates connected to the node L, that is, to the preceding stage of the capacitor C2 (a second capacitor) and supplied with predetermined control signals (3), (4) and (5), respectively; and I13, I14 and I15 denote inverters for reversing the predetermined control signals (3), (4) and (5). The capacitors C13, C14 and C15 (first capacitors) are connected to the node L via the transfer gates G13, G14 and G15, respectively. This embodiment is identical in construction with the FIG. 14 prior art example except the above.

Assuming that the capacitor C13 has a capacity ⅓ that of the capacitor C6 and that C13=C14=C15. When the predetermined control signals (3), (4) and (5) are all low-level, the capacitors C13, C14 and C15 are all disconnected from the node L, and consequently, the voltage Vx of the node L becomes 2Vcc. When any one of the control signals (3), (4) and (5) is high-level, Vx=1.5Vcc; when two control signals are high-level, Vx=1.2Vcc; and the three control signals are all high-level, Vx=2Vcc.

Since the node L can take a voltage value above Vcc, to ensure turning ON/OFF of the transfer gates requires using the node K as the power supply for the control signals (3), (4) and (5).

According to this embodiment, since control by the predetermined control signals (3), (4) and (5) is possible, the internal voltage supply capability can be set arbitrarily in accordance with the DRAM operating condition, the voltage value VBB, IC test conditions, or some other circumstances—this allows designing an easy-to-use substrate bias circuit (a VBB circuit).

As described above, according to this embodiment, it is possible to obtain the same results as obtainable with Embodiment 2, and the capability of supplying the internal voltage VBB can be controlled; hence, ICs rejected as defective so far owing to insufficient voltage supply capability can be made nondefective, and the yield of ICs under test can be improved accordingly.

Moreover, according to this embodiment, since there is no need for laser trimming that involves the connection/ disconnection of the fuses F13 to F15 as referred to above in connection with Embodiment 9, it is possible to reduce the cost and the time for IC testing.

While in this embodiment the capacitors C13, C14 and C15 are connected between the preceding stage of the capacitor C2 (the node L) and the ground via the transfer gates G13, G14 and G15 that are turned ON and OFF by the predetermined control signals, the capacitors C13, C14 and C15 may also be connected via the transfer gates G13, G14 and G15 between the source of the p-channel transistor Q9, which constitutes an inverter at the preceding stage of the capacitor C2 (the node K), and the ground.

Although in the above embodiment the double boost part of the double boost type charge pump circuit has been described as being applied to the substrate bias circuit (the VBB circuit), it may also be applied to a booster circuit.

EFFECT OF THE INVENTION

As will be appreciated from the above, according to the present invention, the amplitude of a repetitive pulse, which is output from a double boost part connected to a first transistor for boosting the amplitude of a clock signal, is made less than twice that of the power-supply voltage. This provides an adequate margin of safety against the breakdown of the gate oxide films of transistors experienced in the prior art. Accordingly, it is possible to provide increased reliability and permit the use of the power-supply voltage over a wider voltage range.

According to the present invention, a first capacitor is connected to the double boost part, and the amplitude of the repetitive pulse, which is output from the double boost part, is made less than twice that of the power-supply voltage through utilization of the charge and discharge of the first capacitor by the clock signal. This provides an adequate margin of safety against the breakdown of the gate oxide films of transistors experienced in the prior art. Accordingly, it is possible to provide increased reliability and permit the use of the power-supply voltage over a wider voltage range.

According to the present invention, a plurality of first capacitors are connected to the double boost part via a plurality of fuses for laser trimming use, and the amplitude of the repetitive pulse, which is output from the double boost part, is made less than twice that of the power-supply voltage through utilization of the charge and discharge of the first capacitor by the clock signal. This improves the yield of ICs under test.

According to the present invention, a plurality of first capacitors are connected to the double boost part via a plurality of transfer gates that are turned ON and OFF by predetermined control signals, and the amplitude of the repetitive pulse, which is output from the double boost part, is made less than twice that of the power-supply voltage through utilization of the charge and discharge of the first capacitor by the clock signal. This improves the yield of ICs under test.

According to the present invention, clamping circuits formed by a plurality of second transistors are connected to the double burst part, and the amplitude of the repetitive pulse, which is output from the double boost part, is made less than twice that of the power-supply voltage. This provides an adequate margin of safety against the breakdown of the gate oxide films of transistors experienced in the prior art. Accordingly, it is possible to provide increased reliability and permit the use of the power-supply voltage over a wider voltage range.

According to the present invention, a second transistor is connected to the double boost part, and the amplitude of the repetitive pulse, which is output from the double boost part, is made less than twice that of the power-supply voltage by controlling the second transistor with a predetermined control signal. This provides an adequate margin of safety against the breakdown of the gate oxide films of transistors experienced in the prior art. Accordingly, it is possible to provide increased reliability and permit the use of the power-supply voltage over a wider voltage range.

According to the present invention, a voltage drop is caused by a through current, which is produced when an inverter in the double boost part is turned ON and OFF by a clock signal, and the amplitude of the repetitive pulse, which is output from the double boost part, is made less than twice that of the power-supply voltage by the voltage drop. This provides an adequate margin of safety against the breakdown of the gate oxide films of transistors experienced in the prior art. Accordingly, it is possible to provide increased reliability and permit the use of the power-supply voltage over a wider voltage range.

According to the present invention, the second transistor is connected to the double boost part, and the amplitude of the repetitive pulse, which is output from the double boost part, is made less than twice that of the power-supply voltage by a voltage drop across the second transistor. This provides an adequate margin of safety against the breakdown of the gate oxide films of transistors experienced in the prior art. Accordingly, it is possible to provide increased reliability and permit the use of the power-supply voltage over a wider voltage range.

It will be apparent that many modifications and variations may be effected without departing from the scope of the novel concepts of the present invention.

What is claimed is:

1. A semiconductor integrated circuit that uses a predetermined power-supply voltage and responds to a clock signal to supply an internal voltage different from said power-supply voltage, said circuit comprising:
    a first transistor for supplying said internal voltage;
    a double boost part connected to said first transistor, for boosting the amplitude of said clock signal; and
    means for making the amplitude of a repetitive pulse from said double boost part less than twice that of said power-supply voltage.

2. The semiconductor integrated circuit of claim 1, further comprising:
    a plurality of fuses for laser trimming; and
    a plurality of first capacitors connected to said double boost part via said plurality of fuses; and
    wherein the amplitude of said repetitive pulse from said double boost part is made less than twice that of said power-supply voltage through utilization of charge and discharge of said plurality of first capacitors by said clock signal.

3. The semiconductor integrated circuit of claim 1, further comprising:
    a plurality of transfer gates that are turned ON and OFF by predetermined control signal; and
    a plurality of first capacitors connected via said plurality of transfer gates to said double boost part; and wherein the amplitude of said repetitive pulse from said double boost part is made less than twice that of said power-supply voltage through utilization of charge and discharge of said plurality of first capacitors by said clock signal.

4. The semiconductor integrated circuit of claim 1, further comprising clamping circuits formed by a plurality of second transistors and connected to said double boost part, and wherein the amplitude of said repetitive pulse from said double boost part is made less than twice that of said power-supply voltage.

5. The semiconductor integrated circuit of claim 4, further comprising:
   a second capacitor connected to the gate of said first transistor; and
   a p-channel transistor forming an inverter at the preceding stage of said second capacitor; and
   wherein said plurality of second transistors are connected between the source of said p-channel transistor and the power supply.

6. The semiconductor integrated circuit of claim 5, wherein said plurality of second transistors are connected between the preceding stage of said second capacitor and the ground.

7. The semiconductor integrated circuit of claim 1, further comprising a second transistor connected to said double boost part, and wherein the amplitude of said repetitive pulse from said double boost part is made less than twice that of said power-supply voltage by controlling said second transistor with a predetermined control signal.

8. The semiconductor integrated circuit of claim 7, further comprising:
   a second capacitor connected to the gate of said first transistor; and
   a p-channel transistor forming an inverter at the preceding stage of said second capacitor; and
   wherein said second transistor is connected between the source of said p-channel transistor and the ground.

9. The semiconductor integrated circuit of claim 8, wherein said second transistor is connected between the preceding stage of said second capacitor and the ground.

10. The semiconductor integrated circuit of claim 1, further comprising an inverter provided in said double boost part, wherein a voltage drop is caused by a through current at the time of the ON/OFF operation of said inverter by said clock signal to thereby make the amplitude of said repetitive pulse from said double boost part less than twice that of said power-supply voltage.

11. The semiconductor integrated circuit of claim 10, further comprising a third transistor provided in said double boost part and connected between the power supply and said inverter, and wherein when said third transistor is OFF, a voltage drop is caused in said third transistor by a through current at the time of the ON/OFF operation of said inverter by said clock signal.

12. The semiconductor integrated circuit of claim 1, further comprising a second transistor connected to said double boost part, and wherein the amplitude of said repetitive pulse from said double boost part is made less than twice that of said power-supply voltage by a voltage drop of said second transistor.

13. The semiconductor integrated circuit of claim 12, further comprising:
   a third transistor provided in said double boost part and connected to the power supply;
   a second capacitor connected to the gate of said first transistor; and
   a p-channel transistor forming an inverter at the preceding stage of said second capacitor; and
   wherein said second transistor is connected between the source of said p-channel transistor and said third transistor.

14. A semiconductor integrated circuit that uses a predetermined power-supply voltage and responds to a clock signal to supply an internal voltage different from said power-supply voltage, said circuit comprising:
   a first transistor for supplying said internal voltage;
   a double boost part connected to said first transistor, for boosting the amplitude of said clock signal;
   means for making the amplitude of a repetitive pulse from said double boost part less than twice that of said power-supply voltage; and
   a first capacitor connected to said double boost part, wherein the amplitude of said repetitive pulse from said double boost part is made less than twice that of said power-supply voltage through utilization of charge and discharge of said first capacitor by said clock signal.

15. A semiconductor integrated circuit that uses a predetermined power-supply voltage and responds to a clock signal to supply an internal voltage different from said power-supply voltage, said circuit comprising:
   a first transistor for supplying said internal voltage;
   a double boost part connected to said first transistor, for boosting the amplitude of said clock signal;
   means for making the amplitude of a repetitive pulse from said double boost part less than twice that of said power-supply voltage;
   a first capacitor connected to said double boost part, wherein the amplitude of said repetitive pulse from said double boost part is made less than twice that of said power-supply voltage through utilization of charge and discharge of said first capacitor by said clock signal;
   a second capacitor connected to the gate of said first transistor; and
   a p-channel transistor forming an inverter at the preceding stage of said second capacitor; and
   wherein a first capacitor is connected between the source of said p-channel transistor and the ground.

16. A semiconductor integrated circuit that uses a predetermined power-supply voltage and responds to a clock signal to supply an internal voltage different from said power-supply voltage, said circuit comprising:
   a first transistor for supplying said internal voltage;
   a double boost part connected to said first transistor, for boosting the amplitude of said clock signal;
   means for making the amplitude of a repetitive pulse from said double boost part less than twice that of said power-supply voltage; and
   a first capacitor connected to said double boost part, wherein the amplitude of said repetitive pulse from said double boost part is made less than twice that of said power-supply voltage through utilization of charge and discharge of said first capacitor by said clock signal; and
   a second capacitor connected to the gate of said first transistor, and wherein said first capacitor is connected between the preceding stage of said second capacitor and the ground.

* * * * *